United States Patent [19]

Locati et al.

[11] Patent Number: 4,509,258

[45] Date of Patent: Apr. 9, 1985

[54] CONNECTOR CENTERING DEVICE AND METHOD FOR USING

[75] Inventors: Ronald P. Locati; James A. Rickrode, both of Harrisburg, Pa.

[73] Assignee: AMP Incorporated, Harrisburg, Pa.

[21] Appl. No.: 396,223

[22] Filed: Jul. 8, 1982

[51] Int. Cl.[3] ........................ H01R 43/00; B23P 19/00

[52] U.S. Cl. ........................................ 29/876; 29/747; 339/65

[58] Field of Search ................. 29/876, 451, 759, 741, 29/760, 464, 739, 450, 235; 140/147; 174/68.5; 339/186 M, 17 LC, 64 R, 64 M, 65, 66 R, 66 M

[56] References Cited

U.S. PATENT DOCUMENTS

| | | | |
|---|---|---|---|
| 2,272,882 | 2/1942 | Brown | 29/84 |
| 3,006,399 | 10/1961 | Garbe | 29/760 X |
| 3,166,372 | 1/1965 | Just | 29/739 X |
| 3,213,406 | 10/1965 | Just et al. | 339/184 |
| 3,277,422 | 10/1966 | Shevlin | 339/65 |
| 3,553,812 | 1/1971 | Weaver et al. | |
| 3,562,696 | 2/1971 | Barnhart et al. | |
| 3,737,998 | 6/1973 | Byrd | |
| 3,947,080 | 3/1976 | Ege | 339/64 M |
| 4,017,961 | 4/1977 | Kochte et al. | 29/450 |
| 4,201,437 | 5/1980 | Lockyer | 339/121 |

FOREIGN PATENT DOCUMENTS

| | | |
|---|---|---|
| 1348118 | 11/1963 | France . |
| 2212444 | 11/1973 | France . |

*Primary Examiner*—Mark Rosenbaum
*Assistant Examiner*—Carl J. Arbes
*Attorney, Agent, or Firm*—Adrian J. LaRue; Anton P. Ness

[57] ABSTRACT

A connector centering device comprises a plate having a projection along which a centering member extends. Legs extend outwardly from the projection and include openings to receive a small number of electrical contacts of an electrical connector therein. The legs with the electrical contacts in the openings and the projection in the shell with the centering member engaging the walls of the shell centers the electrical connector in the opening whereupon the connector is secured in position.

18 Claims, 10 Drawing Figures

CONNECTOR CENTERING DEVICE AND METHOD FOR USING

FIELD OF THE INVENTION

This invention relates to a centering device and more particularly to a centering device for centering electrical connectors in openings of mounting shells.

BACKGROUND OF THE INVENTION

Electrical connectors containing a large number of electrical contacts are mounted in openings of mounting shells. These connectors are secured in position in the openings by retainer plates secured onto the mounting shells. The mounting shells are part of electrical equipment that is pluggably connected with matable electrical connectors resulting in high density electrical connections.

When the electrical connectors have to be removed from the shells to replace electrical contacts or for servicing purposes, it is necessary to precisely reposition the electrical connectors in their openings in the mounting shell so that the large number of electrical contacts can properly electrically mate with their respective electrical contacts in the matable electrical connectors when the electrical equipment is reconnected. Imprecise positioning of the electrical connectors in their openings results in misalignment of the electrical contacts thereby preventing the electrical contacts from mating correctly causing damage to the contacts or not enabling the contacts to mate.

To overcome this problem, the shell openings and the connectors have been machined to maintain accurate positioning requirements. This is expensive.

SUMMARY OF THE PRESENT INVENTION

According to the present invention, a connector centering device comprises a plate having a projection along which a centering member extends. Legs extend outwardly from the projection and include openings to receive a small number of electrical contacts of an electrical connector therein. The legs with the electrical contacts in the openings and the projection in the shell with the centering member engaging the walls of the shell centers the electrical connector in the opening whereupon the connector is secured in position.

According to another aspect of the present invention, the centering device has wall members for engagement with walls of a shell with projection members engaging some of the electrical contacts of an electrical connector or some of the contact openings thereby centering the electrical connector in an opening of the shell whereafter the connector is secured onto the shell.

According to a further aspect of the present invention, a method of centering electrical connectors having rows of electrical contacts in openings of shells comprises placing a centering device in engagement with the walls of a shell, moving an electrical connector into an opening in the shell with some electrical contacts or some contact openings of the electrical connector being engaged by contact-engaging members thereby centering the electrical connector in the opening and securing the electrical connector onto the shell.

BRIEF DESCRIPTION OF THE DRAWINGS

FIG. 8 is a perspective view of a plug connector with a centering device exploded therefrom as a further embodiment.

DETAILED DESCRIPTION OF PREFERRED EMBODIMENTS

Figure 1:
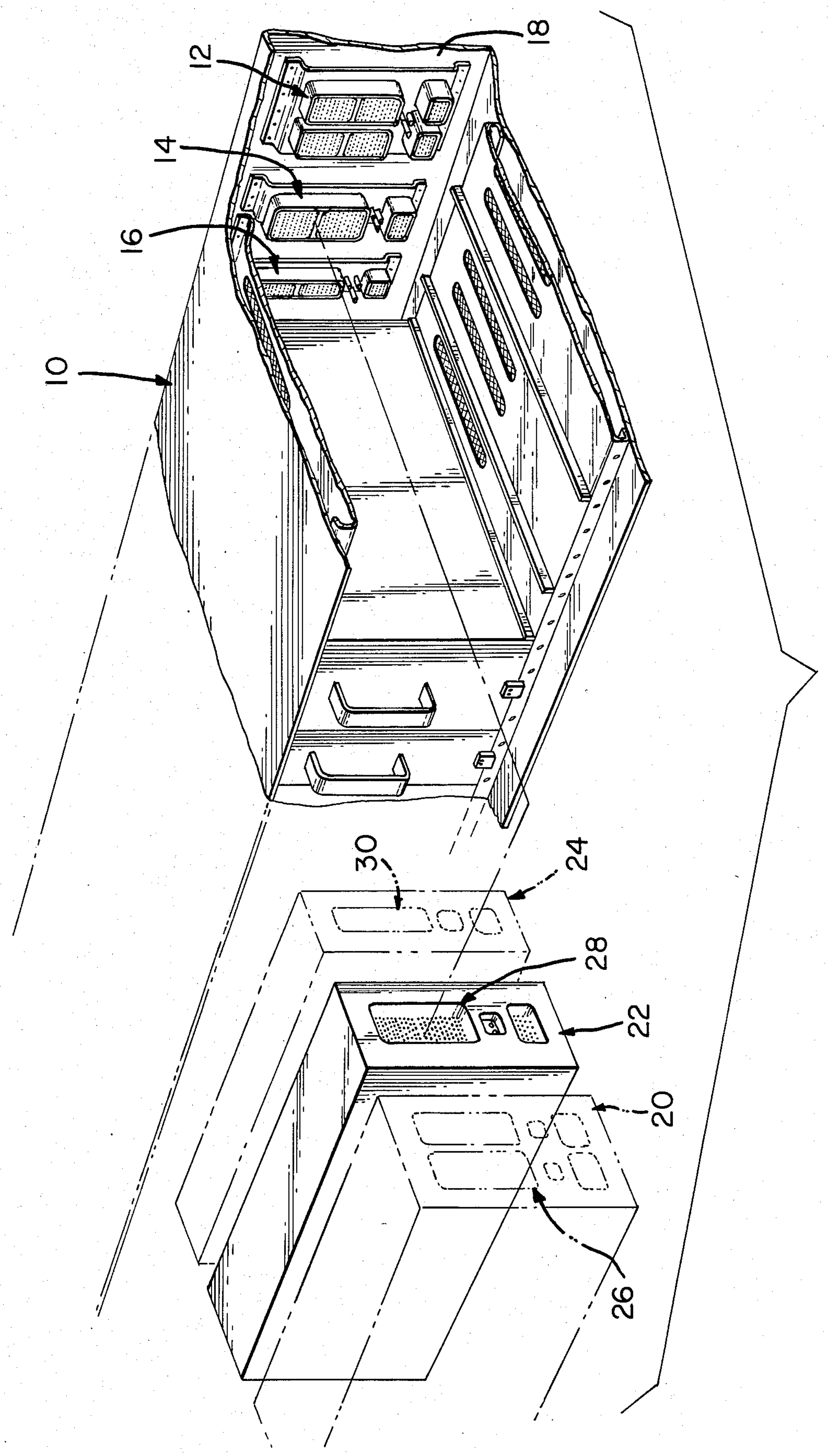
FIG. 1 is a perspective view of electrical plug connectors mounted along a wall of an electronic cabinet with electronic modules having electrical receptacle connectors exploded therefrom.
Figure 2:
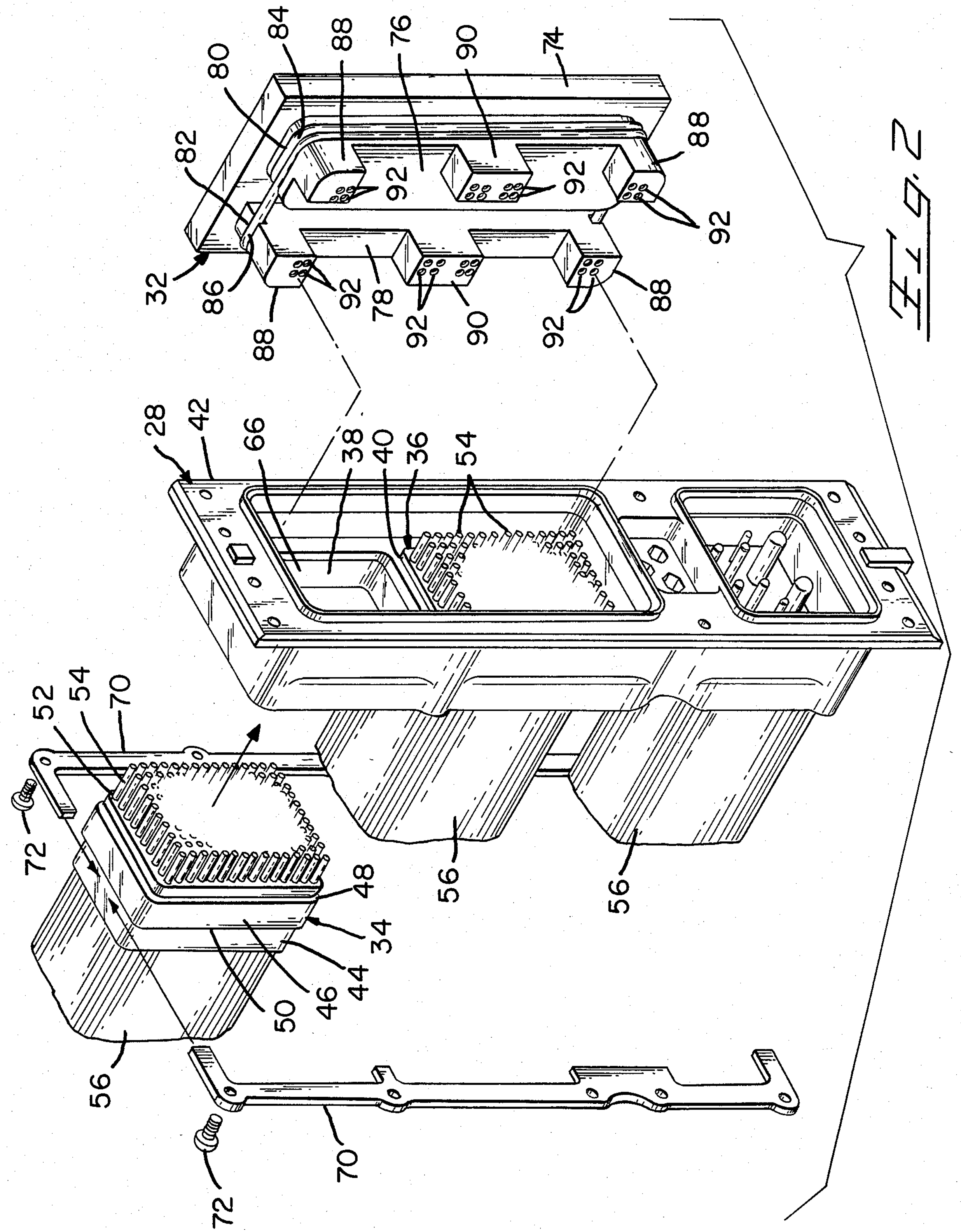
FIG. 2 is a perspective view of a socket shell with an electrical connector, securing members, and centering device exploded therefrom.

FIG. 1 illustrates an electronic cabinet 10 or the like with electrical plug connectors 12, 14, 16 mounted on an inner wall 18. Electronic modules 20, 22, 24 have electrical connectors 26, 28, 30 which respectively electrically connect with electrical plug connectors 12, 14, 16 when electronic modules 20, 22, 24 are positioned in electronic cabinet 10 as pluggable units.

The electrical plug connectors that are matable with the electrical receptacle connectors have a large number of electrical contacts therein of the order of sixty to one hundred fifty contacts thereby resulting in high density electrical connections. It is therefore imperative that connector housings of the electrical plug connectors and the electrical receptacle connectors be centered in the openings of their shells so that the electrical contacts are accurately aligned in order to intermate when the electronic modules are pluggably mounted in position in electronic cabinet 10. Misalignment of the electrical contacts because of non-centering of the electrical connectors renders the connectors unmatable and, if they are matable, increases the insertion forces in addition to possible damage of electrical contacts and housing members when they are forcibly mated.

Figures 7, 9, 10:
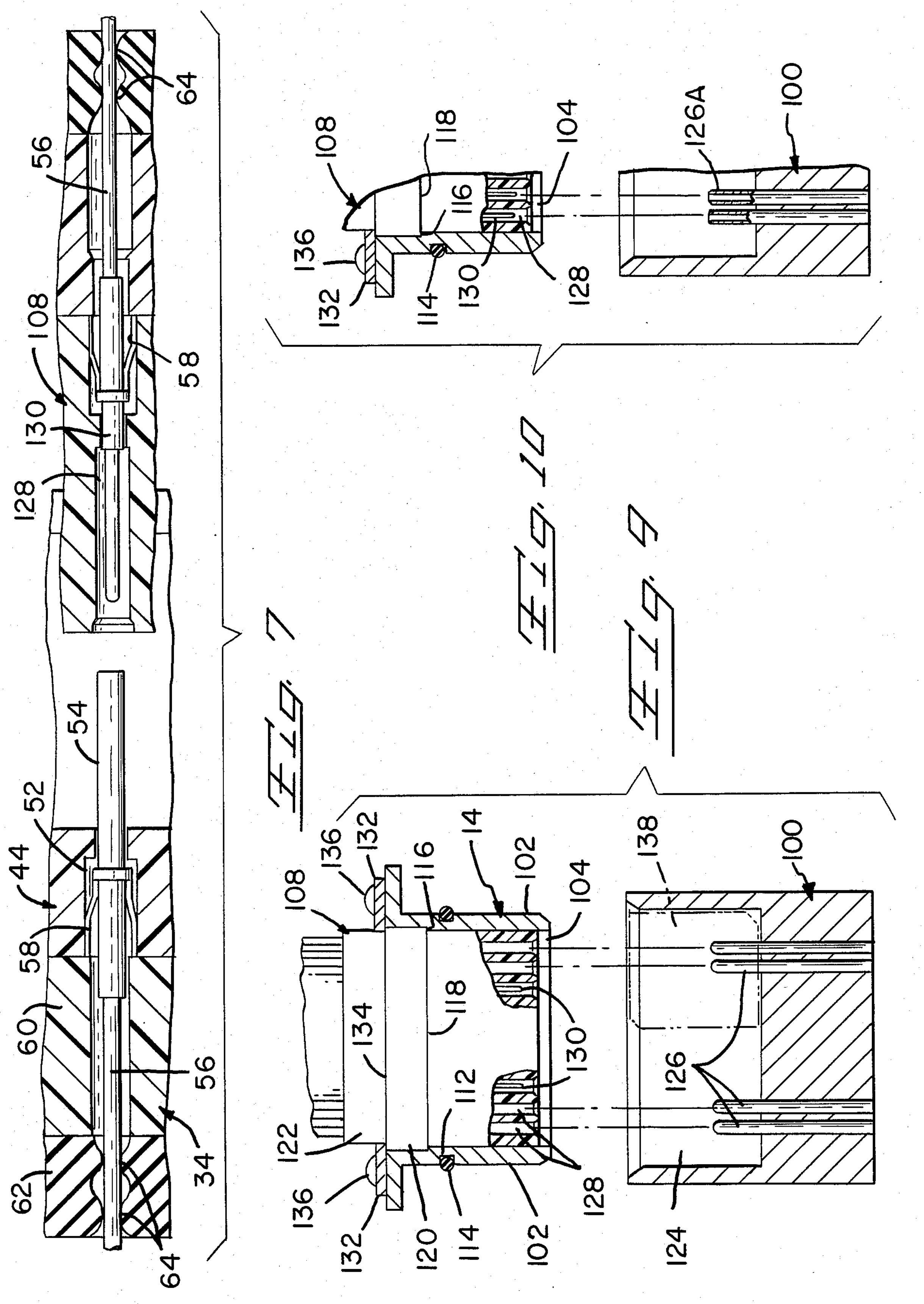
FIG. 7 is a part cross-sectional view showing the electrical connectors and their electrical contacts prior to electrical engagement.
FIG. 9 is a cross-sectional view through the plug connector and centering device.
FIG. 10 is a part cross-sectional view similar to FIG. 9 of an additional embodiment.
Figure 6:
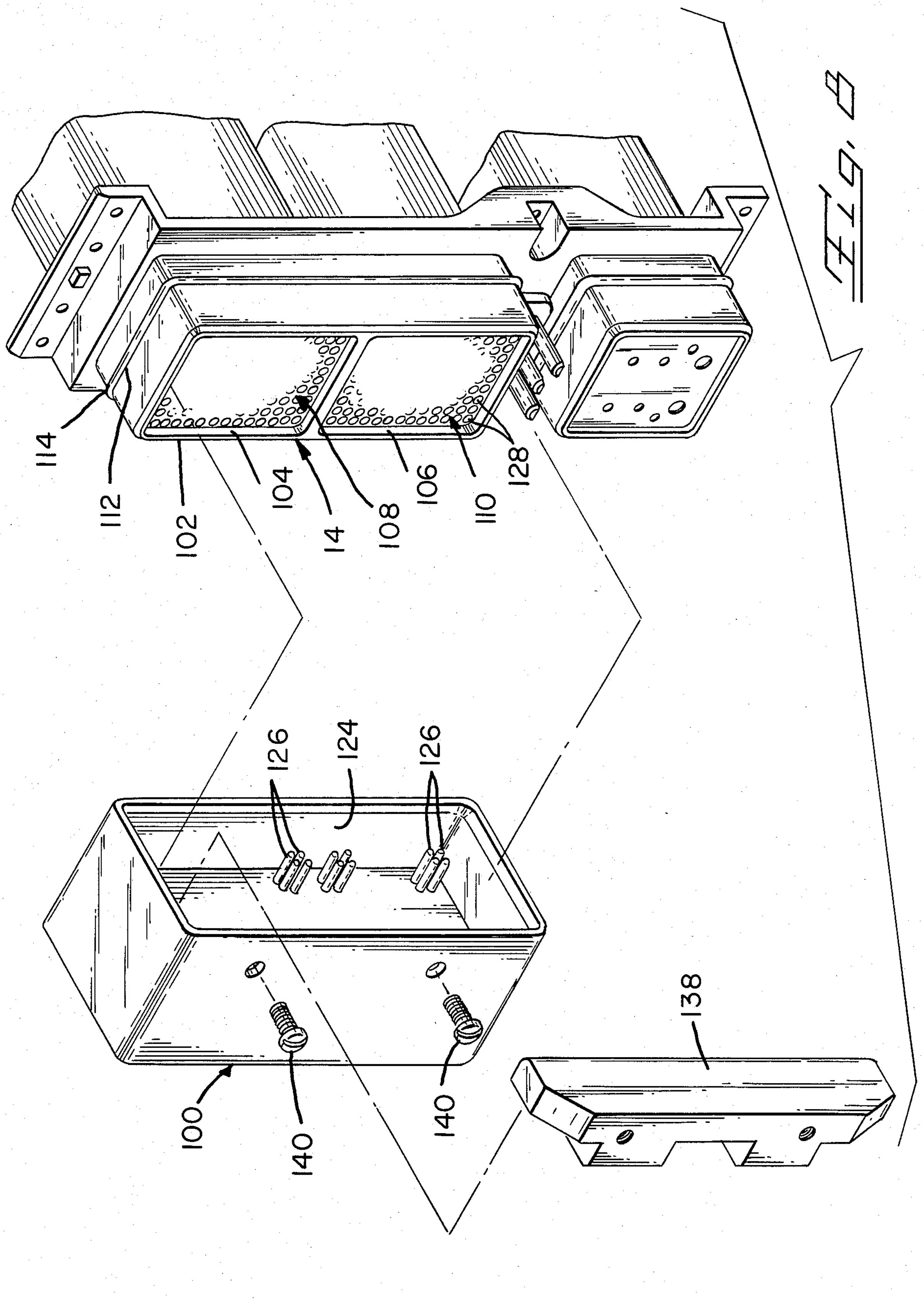

FIGS. 2 through 5 illustrate a centering device 32 for use in conjunction with electrical receptacle connector 28 for centering electrical connectors 34, 36 in openings 38, 40 of metal shell 42 that is secured in position in electronic module 22. Each of electrical connectors 34, 36 have a dielectric housing member 44 molded from a suitable dielectric material. A peripheral projection 46 of housing member 44 provides a front shoulder 48 and a rear shoulder 50. Rows of passageways 52 extend through housing member 44 as shown in FIG. 7 in which electrical receptacle contacts 54 are secured. Electrical receptacle contacts 54 are preferably of the type disclosed in U.S. patent application Ser. No. 364,153 filed Mar. 31, 1982, the disclosure of which is completely incorporated herein by reference. Contacts 54 are terminated to electrical conductors 56. The terminated electrical receptacle contacts 54 are inserted into respective passageways 52 and secured therein by retaining members 58 engaging against sections 60 of housing member 44 as illustrated in FIG. 7. A rubberized section 62 of housing member 44 has spaced annular projections 64 as part of each passageway 52 which engage electrical conductors 56 to form a seal therearound. The electrical connector 34 comprising housing member 44 and receptacle contacts 54 terminated to electrical conductors 56 is positioned within recess 66 of metal shell 42 accommodating peripheral projection 46 with front shoulder 48 engaging stop surface 68 so that the front section of the electrical connector including the receptacle sections of receptacle contacts 54 extending outwardly therefrom extends through opening 38 with front shoulder 48 engaging stop surface 68. Retaining members 70 are secured onto metal shell 42 by screws 72 and they engage rear shoulder 50 thereby securing the electrical connectors 34, 36 in position therein after they have been centered in openings 38 and 40.

The centering device of the invention generally has a shell-engaging means and a connector-engaging means contained on a plate means. With reference to the embodiment shown in FIG. 2, centering device 32 includes a plate 74 from which depends spaced projections 76, 78. Grooves 80, 82 are both disposed respectively in projections 76, 78 with groove 80 extending along the entire periphery of projection 76 and in which O-ring 84 is disposed, whereas groove 82 extends along the top, bottom, and outer side of projection 78 so that O-ring 86 is disposed therein as well as in groove 80. Legs 88 having curved corners extend outwardly from projections 76, 78 at the ends thereof while legs 90 extend outwardly at central locations thereof. Holes 92 are located in each of legs 88, 90 with beveled entrances thereto.

Figures 3, 4, 5:
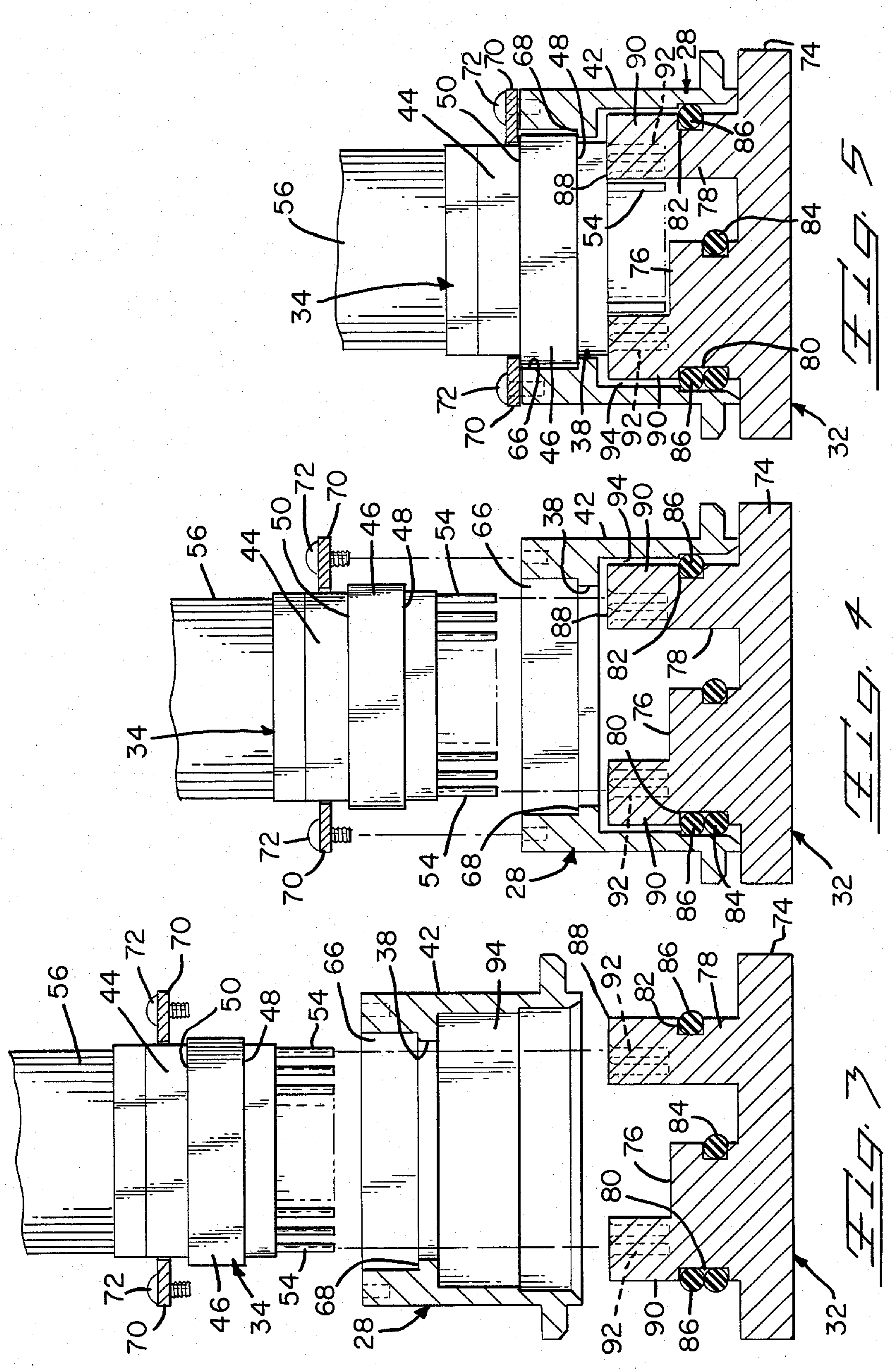
FIG. 3 is an exploded view partly in cross section of the electrical receptacle connector, shell, and centering device.
FIG. 4 is similar to FIG. 3 showing the centering device in position in the shell and the electrical connector exploded therefrom.
FIG. 5 is similar to FIG. 4 showing the electrical connector centered in the shell opening by the centering device and secured onto the shell.

In operation as illustrated in FIGS. 3 through 5 to mount electrical connectors 34, 36 in openings 38, 40 of metal shell 42, centering device 32 has O-rings 84, 86 positioned in grooves 80, 82 so that centering device 32 can be positioned into shell cavity 94 of shell 42 with O-rings 84, 86, and principally O-ring 86, engaging the walls of cavity 94 as illustrated in FIG. 4 thereby positioning legs 88, 90 so that holes 92 are located to receive receptacle contacts 54 at the corners of electrical connectors 34, 36; centering device 32 in this instance acting as an electrical plug connector. Plate 74 limits movement of legs 88, 90 into shell cavity 94. With centering device 32 in position in shell cavity 94 as illustrated in FIG. 4, electrical connectors 34, 36 are positioned in shell 42 with corner contacts 54 moving into holes 92 of legs 88, 90 until front shoulder 48 engages stop surface 68 thereby centering electrical connectors 34, 36 relative to openings 38, 40. Electrical connectors 34, 36 are then secured in position on shell 42 via retaining members 70 and screws 72 whereupon centering device 32 can be removed from cavity 94 of shell 42 thereby resulting in electrical connectors 34, 36 securely and centrally mounted in position in cavity 94 as illustrated in FIG. 5.

Figure 6:
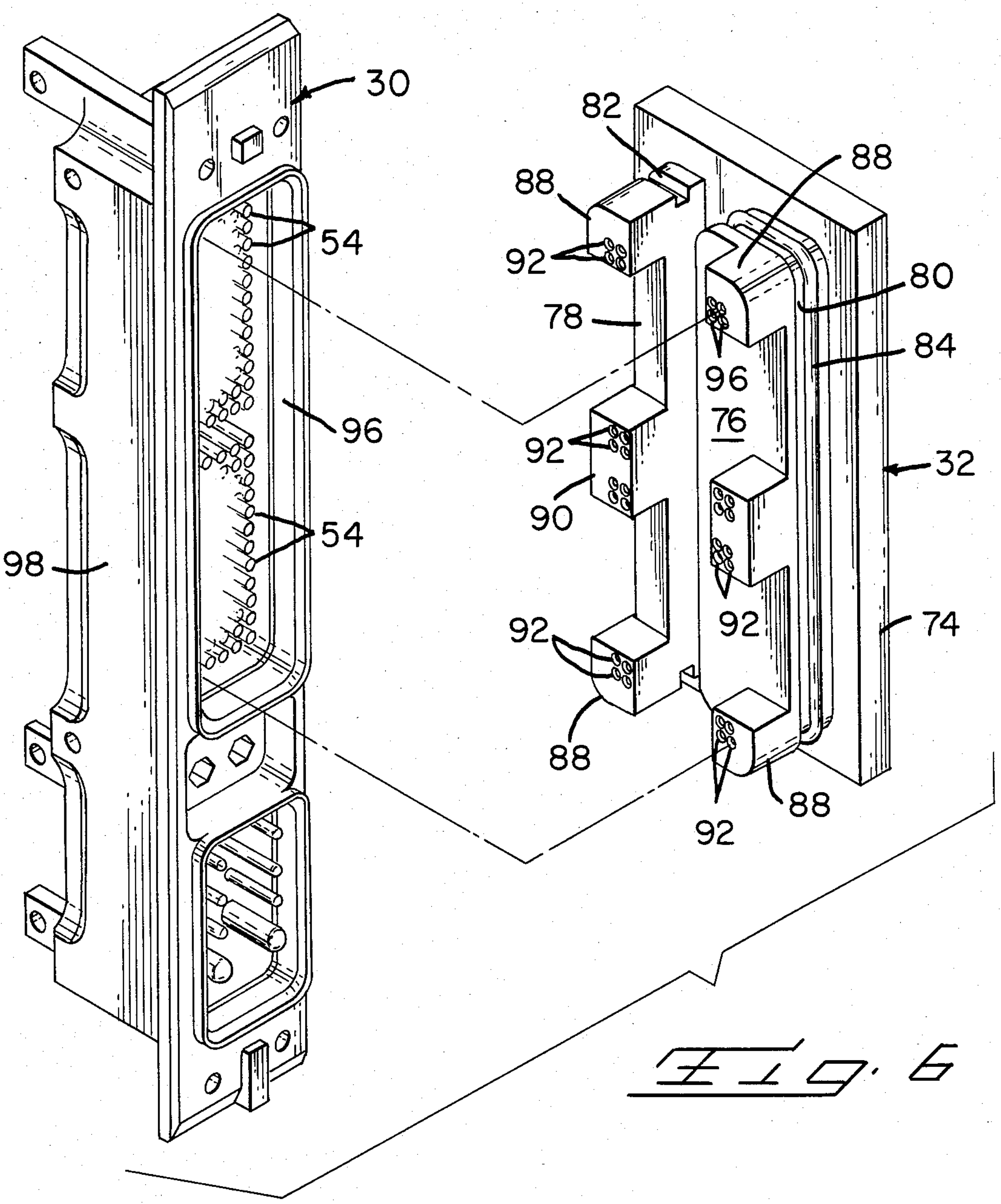
FIG. 6 is an exploded perspective view of an alternative embodiment.

FIG. 6 illustrates centering device 32 for use to centrally and securely mount electrical connectors of less dense receptacle contacts within openings of metal shell 98 by removing O-ring 86 from grooves 80, 82 thereby utilizing projection 76 and O-ring 84 within shell cavity 96 of metal shell 98 to centrally secure the electrical connectors in their respective openings in the same manner as hereinabove disclosed. It is to be understood that centering device 32 can also have a configuration to center and secure single electrical connectors having a large density of electrical receptacles in position in an opening in a single cavity in a metal shell.

FIGS. 8 and 9 illustrate centering device 100 for use in conjunction with electrical plug connectors 12, 14, 16; plug connector 14 being described in conjunction with the use of centering device 100. Plug connector 14 includes a metal shell 102 with connector-receiving cavities 104, 106 extending therethrough and in which electrical connectors 108, 110 are to be secured. A groove 112 is located in the external surface of shell 102 with O-ring 114 disposed therein. Stop surface 116 is located in cavity 104 against which front shoulder 118 of peripheral projection 120 of housing member 122 engages when electrical connector 108 is inserted within cavity 104.

Centering device 100 has a centering device cavity 124 for encompassing shell 102 with O-ring 114 engaging the walls forming the centering device 124 until the front end of shell 102 engages the bottom of centering device cavity 124. Pins 126 are secured in centering device 100 inwardly from the corners thereof and at a central location thereof adjacent the sidewalls forming centering device cavity 124 for insertion into passageways 128 from which electrical pin contacts 130 have been removed for centering electrical connectors 108, 110 relative to cavities 104, 106 whereafter they are secured in position by means of retaining members 132 engaging rear shoulder 134 of peripheral projection 120; retaining members 132 being secured onto shell 102 via screws 136. When electrical connectors 108, 110 have been centrally secured in cavities 104, 106, centering device 100 is removed from shell 102 and electrical pin contacts 130 are secured in position in respective corner passageways 128 of electrical connectors 108, 110.

FIG. 10 illustrates an alternative embodiment of centering device 100 wherein pins 126A have hollow ends for insertion into passageways 128 of electrical connectors 108, 110 to receive therein the pin contact sections of pin contacts 130 thereby not requiring the removal of pin contacts 130 from the corner passageways 128 of electrical connectors 108, 110 when these connectors are being centered relative to cavities 104, 106 and secured in position via retaining members 132 and screws 136.

To use the centering device of FIGS. 8 through 10 on the metal shell of electrical plug connectors 16 for centering electrical connectors having less dense electrical pin contacts therein an insert 138 is secured to the sidewall of centering device 100 within centering device cavity 124 via screws 140 thereby enabling centering device 100 to be used for centering the electrical connectors in the cavities of electrical plug connectors 16 as hereinbefore described. It is also to be understood that centering device 100 can be formed to center a single electrical connector in an opening of a cavity of a metal shell rather than centering two electrical connectors therein if desired.

Single contacts at or near the corners of the electrical connectors can be engaged by the centering devices for centering the electrical connectors in their openings; however, engaging five or more contacts would be preferable with engaging at least four at or near the corners and one or more at or near the center of the electrical connectors.

What is claimed is:

1. A method of centering one or more electrical connectors in respective openings of a shell member, each of said electrical connectors having rows of passageways for containing electrical terminals therein, comprising the steps of:
 placing a centering device in engagement with walls of a said shell member and centering said shell member;
 moving a said electrical connector into an opening in the shell member and into engagement with connector-engaging means of said centering device thereby centering the electrical connector in the opening; and
 securing the electrical connector onto the shell member such that said connector remains centered in said opening following removal therefrom of said centering device.

2. A method as set forth in claim 1 wherein the centering device includes projection means which engages the inner walls of a shell cavity of the shell member.

3. A method as set forth in claim 1 wherein the centering device includes sidewalls defining a centering device cavity which engages the outer walls of the shell member therewithin.

4. A method as set forth in claim 2 wherein said projection means includes said connector-engaging means, said connector-engaging means comprising contact-receiving means positioned on said projection means so as to receive contacts in corner portions of a said electrical connector having contact terminals extending therefrom, for centering said connector.

5. A method as set forth in claim 3 wherein said connector-engaging means comprises pins secured adjacent to and inwardly from said sidewalls of said centering device and positioned so that those said passageways in corners of a said electrical connector are alignable therewith, said method further comprising removing electrical terminals from said passageways in said corners of said electrical connector so that said pins enter said passageways for centering said connector.

6. A method as set forth in claim 3 wherein said connector-engaging means comprises pins having hollow ends, which pins are secured adjacent to and inwardly from said sidewalls of said centering device and positioned so as to be aligned with pin terminals within said passageways in corners of a said electrical connector such that said pins may enter said passageways and said pin contacts may simultaneous enter said hollow ends of said pins, for centering said connector.

7. A method as set forth in claim 1 further comprising, after centering and securing in said shell member said one or more of electrical connectors, the step of removing said centering device therefrom.

8. A centering device for centering one or more electrical connectors in respective openings of a shell member prior to interconnection of said one or more connectors to corresponding one or more electrical connectors matable therewith, each of said electrical connectors having a plurality of passageways for containing electrical contacts therein, comprising:
 a plate means;
 shell-engaging means extending from said plate means for engaging walls of a said shell member to center said centering device relative to an opening of the shell member in which a said electrical connector is to be mounted; and
 connector-engaging means on said plate means for engaging the electrical connector thereby centering the electrical connector as the electrical connector is positioned in said opening of the shell member whereafter the electrical connector is secured to said shell member in a centered position in said opening, said centering device being removable therefrom after said one or more connectors have been so secured such that said one or more electrical connectors remain centered in said opening for interconnection with corresponding one or more electrical connectors matable therewith.

9. A centering device as set forth in claim 8 wherein said shell-engaging means comprises projection means extending outwardly from said plate means and having peripheral groove means therein, and a first O-ring means in said groove means for engaging inner walls of a shell cavity of a shell member into which said projection means of said centering device is placed, to center said shell member on said centering device.

10. A centering device as set forth in claim 9 wherein said projection means includes said connector-engaging means.

11. A centering device as set forth in claim 9 wherein said projection means include spaced projection members with said first O-ring means extending around said spaced projection members and a second O-ring means extending around one of said spaced projection members in a peripheral groove around said one of said spaced projection members.

12. A centering device as set forth in claim 8 wherein said shell-engaging means comprises sidewalls forming a centering device cavity within which outer walls of a shell member are to be disposed and said connector-engaging means extend outwardly from the bottom of said centering device cavity.

13. A centering device as set forth in claim 12 wherein insert means is secured in said centering device cavity to accommodate a smaller size shell member.

14. A centering device as set forth in claim 8 wherein said connector-engaging means comprises contact-receiving means positioned on said centering device so as to receive contacts in corner portions of a said electrical connector having contact terminals extending therefrom, for centering said connector.

15. A centering device as set forth in claim 10 wherein said connector-engaging means comprises contact-receiving means positioned on said projection means so as to receive contacts in corner portions of a said electrical connector having contact terminals extending therefrom, for centering said connector.

16. A centering device as set forth in claim 8 wherein said shell-engaging means comprises spaced projection members extending outwardly from said plate means, and there being a first peripheral groove means around outwardly facing sides of said spaced projection members where a first O-ring means is removably secured, and there being a second groove means around one of said spaced projection members where a second O-ring means is secured, said spaced projection members include said connector-engaging means, said connector-engaging means comprises contact-receiving means positioned on said projection means so as to receive contacts in corner portions of a said electrical connector having contact terminals extending therefrom, so that when said first O-ring means is not positioned on said centering device, said connector may be centered by said centering device on a smaller size shell member.

17. A centering device as set forth in claim 12 wherein said connector-engaging means comprises pins secured adjacent to and inwardly from said sidewalls of said centering device and positioned so as to be insertable into those said passageways in corners of a said electrical connector from which passageways electrical contacts have been removed, for centering the connector.

18. A centering device as set forth in claim 12 wherein said connector-engaging means comprises pins having hollow ends and being secured adjacent to and inwardly from said sidewalls of said centering device and positioned so as to be insertable into those said passageways in corners of a said electrical connector, said passageways containing pin contacts therein insertable into said hollow ends of said pins of said centering device.

* * * * *